(12) United States Patent
Shook (10) Patent No.: US 8,371,660 B2
(45) Date of Patent: Feb. 12, 2013

(54) LOAD TRANSMITTING INSERT FOR A SOFT SPLINE BODY

(76) Inventor: William B. Shook, Tampa, FL (US)

(*) Notice: Subject to any disclaimer, the term of this patent is extended or adjusted under 35 U.S.C. 154(b) by 305 days.

(21) Appl. No.: 12/802,817

(22) Filed: Jun. 15, 2010

(65) Prior Publication Data

US 2010/0254752 A1  Oct. 7, 2010

Related U.S. Application Data

(63) Continuation-in-part of application No. 12/141,483, filed on Jun. 18, 2008, now abandoned.

(60) Provisional application No. 60/936,302, filed on Jun. 19, 2007.

(51) Int. Cl.
*B60B 19/00* (2006.01)

(52) U.S. Cl. ........ 301/6.9; 301/6.1; 301/110.5; 474/116

(58) Field of Classification Search ................... 301/6.1, 301/6.5, 6.9, 110.5–110.6; 192/64, 217.4, 192/217.5; 474/116, 160; 403/359.1–359.2, 403/359.5–359.6; 74/496, 498
See application file for complete search history.

(56) References Cited

U.S. PATENT DOCUMENTS

| | | | |
|---|---|---|---|
| 72,409 A | 12/1867 | Mason | |
| 2,066,395 A | 1/1937 | Eksergian | |
| 4,359,294 A | 11/1982 | Crillesen | |
| 6,428,236 B2 | 8/2002 | Aota et al. | |
| 6,620,050 B2 | 9/2003 | Park | |
| 6,705,946 B2 | 3/2004 | Bridges | |
| 7,351,171 B2 | 4/2008 | Kanehisa et al. | |
| 2008/0315679 A1* | 12/2008 | Shook | 301/110.5 |
| 2011/0175433 A1* | 7/2011 | Chiang | 301/110.5 |
| 2011/0193406 A1* | 8/2011 | Chiang | 301/110.5 |

* cited by examiner

*Primary Examiner* — Jason Bellinger
(74) *Attorney, Agent, or Firm* — David C. Purdue

(57) ABSTRACT

A splined drive body for supporting a plurality of sprockets is disclosed. The drive body is provided with at least one composite drive body spline which consists of a first portion made up of the drive body material and a second portion made up of a different, harder material. The second portion of the composite drive body spline is an insert which includes a force receiving surface and a force transmitting surface and is operable to transmit force transmitted to it into the drive body through a force receiving surface provided on the first portion of the composite drive body spline.

12 Claims, 10 Drawing Sheets

LOAD TRANSMITTING INSERT FOR A SOFT SPLINE BODY

BACKGROUND OF THE INVENTION

1. Field of the Invention

The present invention relates to multiple speed sprocket drive systems like the kind found on many bicycles. More specifically, the invention is concerned with a composite spline including a hard insert on a drive body in such a system.

2. Description of the Prior Art

On bicycles, rear bicycle wheel hubs are fitted with splined drive bodies to support multiple drive sprockets. Back in the nineteen seventies, it was fairly common to see five drive sprockets on a drive body. These drive sprockets cooperated with two sprockets or chain rings on the crank to provide the rider with ten different available gear ratios or speeds. However, in recent years, in order to increase the number of "speeds" available to bicyclists, the number of drive sprockets on the drive bodies in rear bicycle wheel hubs has been increasing and the thickness of each sprocket has been decreasing in order to fit the additional sprockets into the limited space available. Designers of high performance bicycles strive to make them light in weight as performance is, generally speaking, inversely related to weight. As weight goes down, performance ratings generally go up. Splined drive bodies on which sprockets are mounted are often made of relatively hard material, i.e., steel. However, many high performance bicycle wheel hubs include splined drive bodies made of a relatively soft material, i.e., aluminum alloy.

Figure 1:
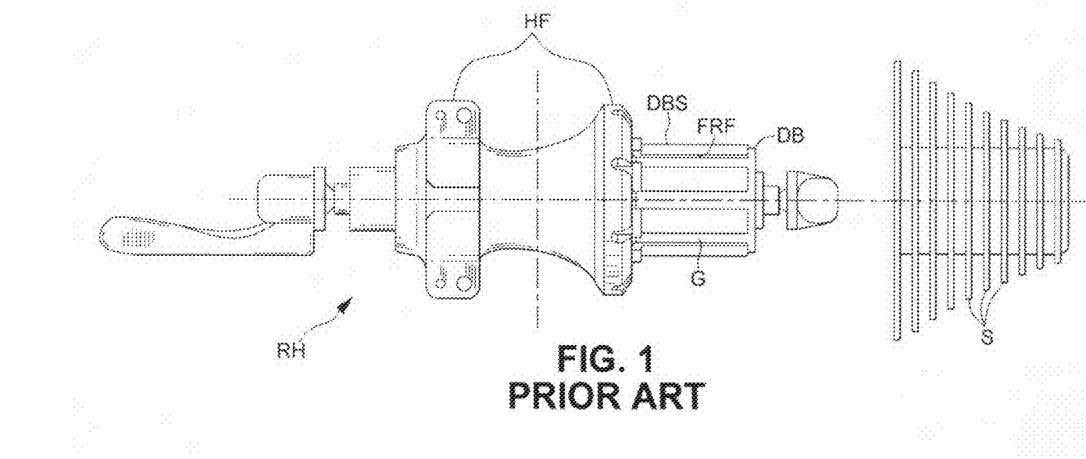
FIG. 1 is a partially exploded view of a rear bicycle wheel hub and a cluster of sprockets with the sprocket cluster lined up on the axis of the hub.

A rear hub RH of a multiple speed bicycle is shown in FIG. 1 and generally includes a plurality of sprockets S which are mounted on an externally splined drive body DB. The sprockets S (FIGS. 1 and 1A) are internally splined in a complimentary way so that torque transmitted by a chain (not shown) to the sprockets S is, in turn, transmitted to and through the drive body DB and, in known fashion, to hub flanges HF and to the rear wheel associated with rear wheel hub RH. A conventional derailleur system (not shown) is used to move the chain (not shown) onto and off of the various sprockets S affording the rider the option to select and engage different drive ratios. The drive body DB has a tubular shape and it is provided with a plurality of splines DBS which extend a short distance radially outwardly from an outer surface of the drive body DB. In between the drive body splines DBS, there are corresponding grooves G. The grooves G and the splines DBS extend in an axial direction over most of the width of the drive body DB. Each sprocket S (FIG. 1A) has a mounting hole in its center and the hole is defined by sprocket hole splines SHS which compliment the drive body splines DBS. In this configuration, torque transmitted to a sprocket (by a chain or the like—not shown) is, in turn, transmitted to the drive body DB in the rear hub RH. Each drive body spline DBS has a force receiving face FRF (FIG. 1) which cooperates with a force transmitting face FTF (FIG. 1A) of the sprocket hole splines SHS whereby torque transmitted to one of the sprockets S is transmitted to the drive body DB.

Figure 1A:
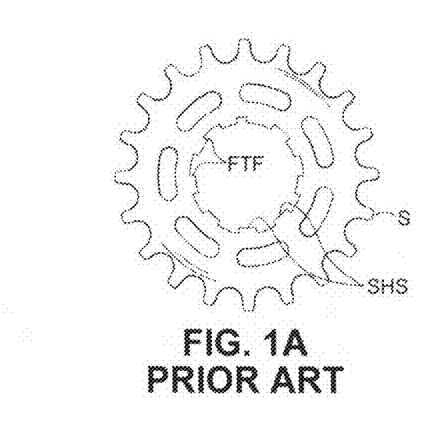
FIG. 1A is a side view of a sprocket.

The force transmitting faces FTF of the sprockets S have very small surface areas with the result that extremely high loads are transmitted to very small portions of the force receiving faces FRF of the drive body splines DBS. Drive bodies DB made of steel can generally withstand these high loads. However, in high performance hubs with steel sprockets and lightweight drive bodies made of aluminum alloy or of other relatively lighter but relatively softer material, the force transmitting faces FTF of the sprockets S can and do cause damage to the force receiving faces FRF of the drive body splines DBS. This will cause wear and, eventually, the sprocket and the drive body will no longer be rotationally locked relative to each other and this can accelerate the rate at which the wear occurs. In recent years, the thickness of the sprockets S has been decreasing in order to fit even more sprockets onto a drive body. One consequence of this trend is that even higher loads are being transmitted from the force transmitting faces FTF of the sprocket hole splines SHS to even smaller portions of the force receiving faces FRF of the drive body splines DBS.

SUMMARY OF THE INVENTION

The present invention is based upon the discovery that undue wear of the drive body splines of drive bodies DB made of a relatively soft material, such as aluminum alloy, can be avoided by using a drive body spline insert made of a relatively harder material, such as steel. According to the invention, a drive body is provided with at least one composite drive body spline which consists of a first portion made up of the drive body material and a second portion made up of a different, harder material. The second portion of the composite drive body spline is an insert which includes a force receiving surface and the insert is operable to transmit force transmitted to it into the drive body through the first portion of the composite drive body spline. The composite spline and, specifically, the harder insert which forms part of the composite spline, prevents damage to the softer drive body material in high performance rear wheel bicycle hubs.

The present invention relates to a drive body for a bicycle hub and the drive body includes at least one composite spline on an outer surface of the drive body of the hub. The drive body and a first portion of the composite spline are made of a relatively soft material and the composite spline includes a second portion comprised of at least one insert made of a harder material. The insert is preferably secured to the drive body by an overlapping portion of the drive body material.

The primary object of the present invention is to provide a steel or hard insert which effectively resists damage to relatively soft drive body splines made of, for example, aluminum alloy, that would otherwise result from the extremely high loads imposed on the splines by force transmitting faces of thin sprocket hole splines made of a relatively hard material such as steel.

The details of the present invention will become clearer from the following description considered together with the accompanying drawing figures which show, for purposes of illustration only, several embodiments of the present invention.

DETAILED DESCRIPTION OF THE PREFERRED EMBODIMENT AND OTHER EMBODIMENTS

Referring to FIGS. 2 through 6, a drive body 10 for a rear bicycle wheel hub (not shown; see FIG. 1, generally) is a tubular body with a plurality of splines. There are three kinds of splines on drive body 10. A centering spline 12 is used as a reference when mounting sprockets (not shown; see FIG. 1 generally) on the drive body 10. A regular spline 14 is integral with the drive body 10 and is, of course, made of the same material as the drive body 10. A composite spline 16 comprises a first portion 18 that is integral with the drive body 10 and is made up of the same material as the drive body 10. The composite spline 16 also comprises a second portion 20 that comprises an insert which is made up of a different, harder material than the material of the drive body 10. The regular splines 14 all have force receiving surfaces 22 to and through which force is transmitted from a sprocket and, specifically, from force transmitting faces (FTF as shown in FIG. 1) of sprocket hole splines (SHS as shown in FIG. 1) when torque is applied to the sprocket (S as shown in FIG. 1).

In the composite splines 16, there is a force receiving surface 24 and that surface is formed on the insert or second portion 20 of the composite spline 16, which insert is made of a relatively hard material in contrast to the first portion 18 which is made of a relatively soft material. The relatively hard material from which the second portion or insert 20 is made, resists wear much better than the relatively soft material from which the drive body 10 and the splines 12 and 14 and the first portions 18 of the composite splines 16 are all made. Thus, the drive body 10 and, specifically, the splines 12, 14 and 16 will all wear down more slowly than the splines in a conventional drive body where the splines are made of the same material as the drive body 10 and the drive body does not include at least one composite spline 16. Also on the insert 20, opposite the force receiving surfaces 24, there are force transmitting surfaces 25 (FIGS. 2 and 6) through which forces are transmitted from the insert 20 to the first portion 18 of the composite spline 16, as described below.

Figure 2:
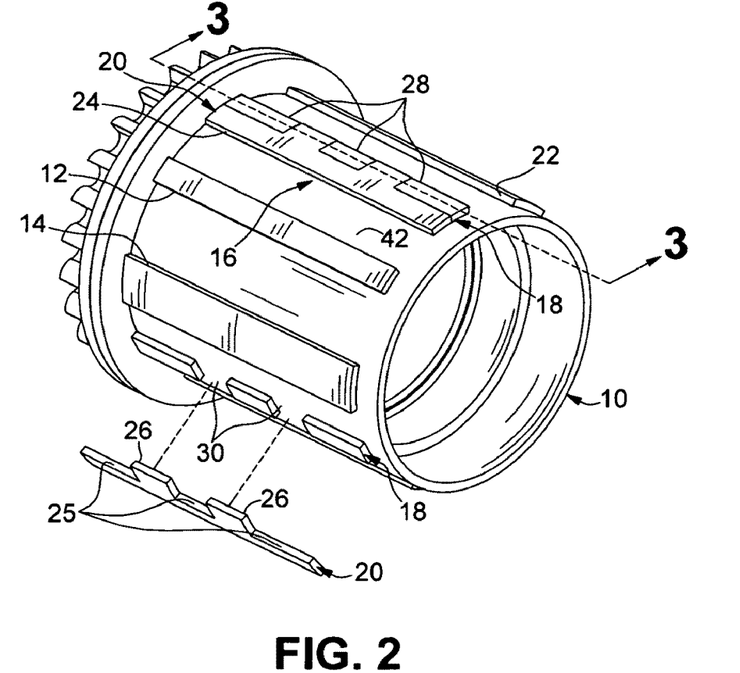
FIG. 2 is a perspective, partially exploded, view of a drive body showing inserts and a composite spline according to the invention.

The second portion of the composite spline 16 is the insert 20 which includes a pair of tabs 26 which cooperate with the first portion 18 of the composite spline 16 to hold the insert 20 in place. The first portion 18 of the composite spline is made of three raised, axially extending sections 28 which are integral with the drive body 10. Each section 28 includes a force receiving surface 29 (FIG. 6) to which force is transmitted by the force transmitting surfaces 25 of the insert 20. Two circumferentially extending grooves, indicated at 30 in FIG. 2, are defined by the three sections 28.

Figure 3:
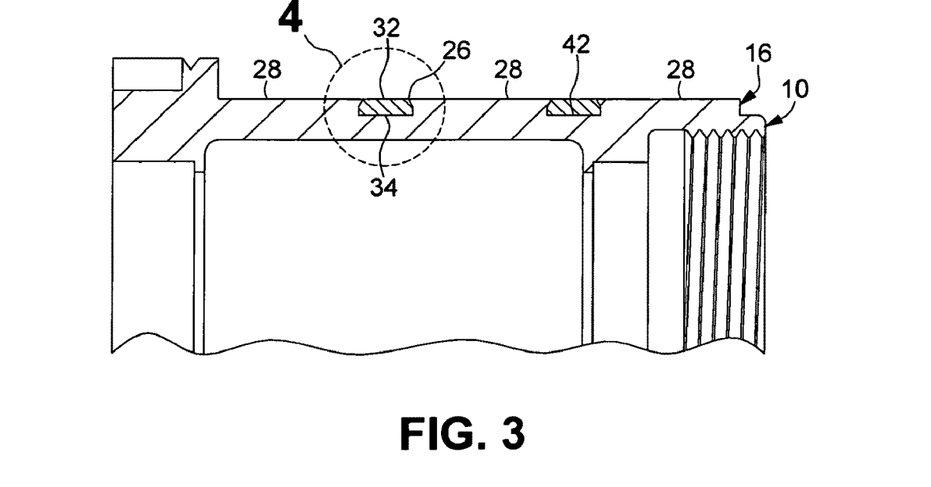
FIG. 3 is a cross-sectional view taken along the line 3-3 in FIG. 2.
Figure 4:
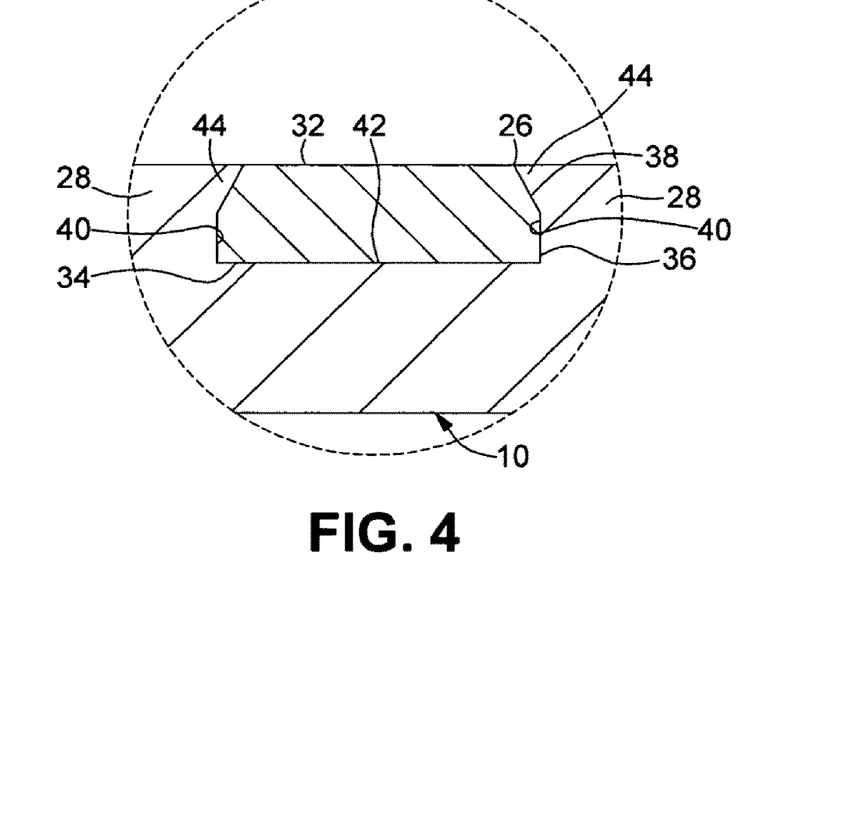
FIG. 4 is a close up view of the area designated 4 in FIG. 3.
Figure 5:
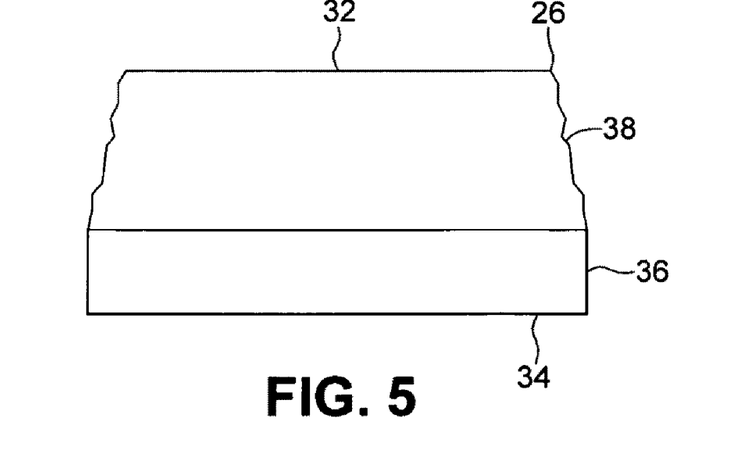
FIG. 5 is an end view of a tab extending from the insert shown in previous FIGS.

FIGS. 3 through 5 reveal some details about how the insert 20 may be secured into place to become part of the composite spline 16. The insert 20 may be produced by stamping it out of a sheet of steel, a process wherein sheet steel is positioned between a punch and a die that are shaped to produce a part having the outline shown for the insert 20. When the punch is driven towards the die, an insert is produced by shearing action on the steel sheet. When stamping is used to produce the insert 20 with the tabs 26, so that an upper surface 32 is engaged by the punch and a lower surface 34 is engaged by the die, the sides of the insert 20, including the sides of the tabs 26, as shown especially in FIG. 5, will have a contoured surface. A portion of the side surface of the insert 20 and of the tab 26 that is adjacent to the lower surface 34 of the insert 20 will have a substantially smooth perpendicular shear region indicated at 36. A portion of the side surface of the insert 20 and the tab 26 that is adjacent to the upper surface 32 of the insert 20 will have an angled or tapered, somewhat rough or jagged break away region, as indicated at 38 in FIG. 5. This naturally occurring taper in the insert 20 results automatically from the use of a stamping production method for producing the insert 20. It can be used to advantage in securing the insert 20 to the drive body 10 if the grooves 30 (FIG. 2) are sized to have a width that is less than the width of the tab 26 of the insert 20 in the vicinity of the substantially smooth perpendicular shear region indicated at 36 and if the grooves 30 are sized to have a width that is about equal to the width of the tab 26 where the jagged break away region 38 meets the upper surface 32. The tabs 26 can then be positioned next to the grooves 30 so that the tabs 26 are aligned with the grooves 30. Force is then applied to the force receiving surface 24 of the insert 20 to force the tabs 26 to enter the grooves 30 and the insert 20 is advanced, clockwise, as seen in FIG. 2, until the insert 20 reaches the position shown at the top of FIG. 2, where the force transmitting surfaces 25 of the insert 20 contact the force receiving surfaces 29 of the sections 28 of the first portion 18 of the composite spline 16. Because parts of the tabs 26 have widths that are wider than the widths of the grooves 30, and because the inserts 26 are made of a material that is relatively harder than the material from which the drive body 10 and the sections 28 are made, the tabs 26 will actually displace portions of the three sections 28 of the first portion 18 of the composite spline 16, producing an undercut condition as shown in FIGS. 3 and 4. The result is that the insert 20 will be held fast in its place in the composite spline 16 by co-action between the tabs 26 and the portions of the sections 28 that define the grooves 30 in a configuration that brings to mind a dovetail joint.

As shown in FIGS. 3 and 4, a portion of the drive body 10, specifically, portions of the sections 28 of the first portion 18 of the composite spline 16, overlap portions of the inserts 20, specifically, portions of the tabs 26, to hold the insert 20 in its place in the composite spline. The force receiving surface 24 on the insert 20 will see very high force loading in service but these forces will act to push the insert 20 into the sections 28 of the first portion 18 of the composite spline so these forces will be transmitted to and through the insert 20 to the first portion 18 of the composite spline 16 where the forces can act over a larger area and be resolved.

The insert 20 is positively locked against axial movement, in both axial directions, relative to the drive body 10, by the engagement between the tabs 26 and the sections 28 of the first portion 18 of the composite spline 16. It will be appreciated that engagement between either one of the tabs 26, by itself, and two adjacent ones of the sections 28 of the first portion 18 of the composite splines will positively lock the insert 20 against axial movement, in both axial directions, relative to the drive body 10. Engagement between one side of one of the tabs 26 and the adjacent section 28 of the first portion 18 of the composite spline prevents relative movement between the drive body 10 and the insert 20 in a first axial direction while engagement between the other side of that tab 26 and the adjacent section 28 of the first portion 18 of the composite spline prevents relative movement between the drive body 10 and the insert 20 in a second, opposite axial direction. Further, the insert 20 is positively locked against radial movement, in both radial directions, because two, paired overlapped portions 40 of each of the tabs 26 on the inserts 20 are positively locked between the drive body 10 and, specifically, an outer surface 42 of the drive body 10, and two paired overlapping portions 44 of adjacent sections 28 of the first portion 18 of the composite spline 16. Again, engagement between a single tab 26 with two paired overlapped portions 40 and overlapping portions 44 of two adjacent sections 28 of the first portion 18 of the composite spline 16 will serve to lock the drive body and the insert 10 against relative movement in a radial direction. Frictional engagement between the tabs 26 and the sections 28 of the first portion 18 of the composite splines 16 (as well as frictional engagement between a single tab and two adjacent sections 28 of the first portion 18 of the composite spline 16) resists relative circumferential movement, in both directions, between the insert 20 and the drive body 10. However, co-action between the force transmitting surfaces 25 on the insert 20 (FIGS. 2 and 6) and the force receiving surfaces 29 on the sections 28 of the first portion 18 of the composite splines 16, positively prevents movement of the inserts 20 in a circumferentially clockwise direction, relative to the drive body 10. Moreover, it will be appreciated that, when a force is transmitted through a force transmitting face FTF (FIG. 1) of a sprocket S to a portion of the force receiving surface 24 (FIGS. 2 and 6) of the insert 20 having a given surface area, that force will be transmitted, in turn, through the insert 20 to force receiving surfaces 29 of the sections 28 of the first portion 18 of the composite spline 16, and those force receiving surfaces 29 have a surface area that is substantially larger than the given surface area. In this way, the relatively hard inserts 20 of the composite splines 16 serve to receive highly concentrated forces over a small, given surface area and to transmit those forces to the softer drive body material over surface areas that are substantially larger than the given surface areas. This serves to resist wear of the drive body splines 14 and 12.

It will be appreciated that the inserts 20, and inserts described hereinafter, may desirably have a curvature matching the curvature of the outer surface 42 of the drive body 10 against which the inserts 20 abut. Such a curvature can be easily provided, in case the inserts are produced by stamping, by the tooling used to carry out the stamping.

In FIG. 5, the tapered portions 38 of the sides of the tabs 26 of the insert 20 are shown to be quite rough. This is a representation of the naturally resulting roughness in case the insert 20 is produced by the stamping method described above. These surfaces of the tapered portions 38 can be smoothed somewhat before the tabs 26 are engaged with the sections 28 to produce the undercutting shown especially in FIGS. 3 and 4. It will be appreciated, however, that some roughness on the sides of the tabs 26 may well serve to effectively increase the frictional grip that will hold the inserts 20 of the composite spline 16 in place in service.

Figure 6:
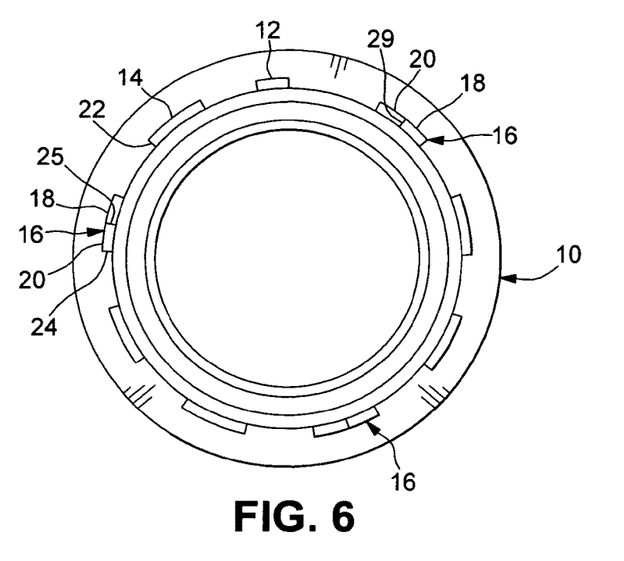
FIG. 6 is an end view of the rear bicycle wheel hub showing three composite splines including inserts according to the invention.

In FIG. 6, the drive body is illustrated as having three composite splines 16. It will be appreciated that many of the advantages of the present invention can be achieved in a drive body having only one composite spline. Indeed, a drive body according to the invention will have at least one composite spline.

Figure 7:
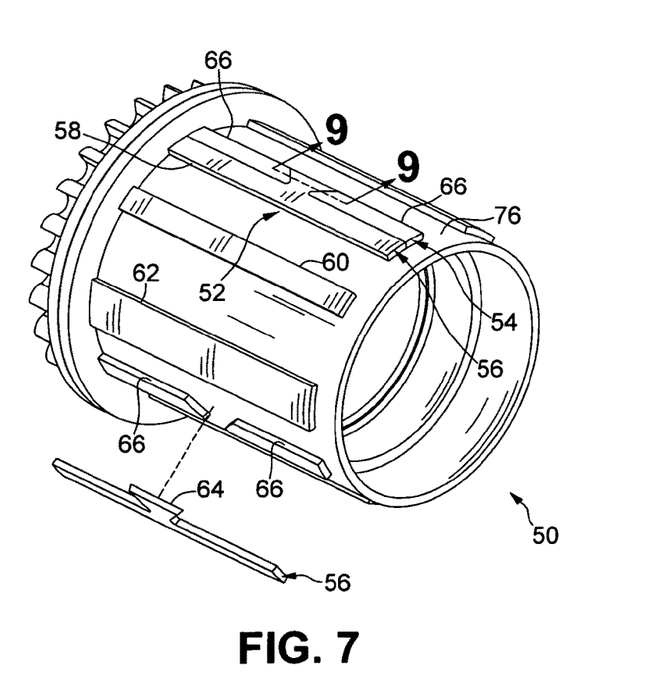
FIG. 7 is a perspective, partially exploded, view of a drive body showing inserts and a composite spline according to a second embodiment of the invention.
Figure 8:
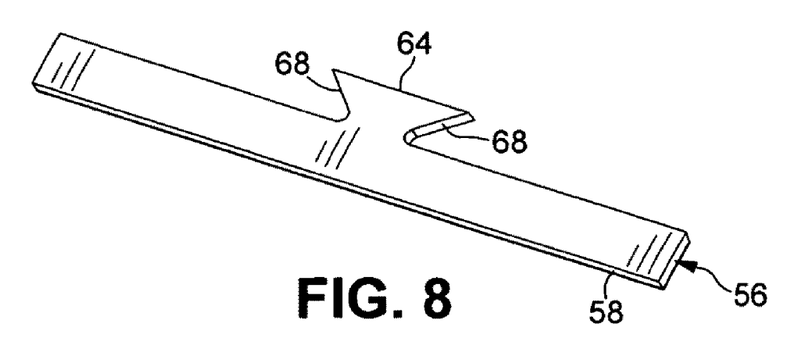
FIG. 8 is a perspective view of the insert shown in FIG. 7.

A second embodiment of a drive body with a composite spline is indicated generally at 50 in FIG. 7. The drive body 50 is similar to the drive body 10 except that the drive body has a different composite spline arrangement. In FIG. 7, a composite spline 52 comprises a first portion 54 that is integral with the drive body 50 and is made up of the same material as the drive body 50. The composite spline 52 also comprises a second portion 56 that comprises an insert which is made up of a different, harder material than the material of the drive body 50. In the composite splines 52, there is a force receiving surface 58 and that surface is formed on the insert or second portion 56 of the composite spline 52. The drive body 50 includes a locator spline 60 and regular splines 62. The relatively hard material from which the second portion or insert 56 is made, resists wear much better than the relatively soft material from which the drive body 50 and the splines 60 and 62 and the first portion 54 of the composite splines 52 are all made. Thus, the drive body 50 and, specifically, the splines 52, 60 and 62 will all wear down more slowly than the splines in a conventional drive body where the splines are all made of the same material as the drive body 10 and the drive body does not include at least one composite spline 16 with an insert made of a harder material.

Figure 9:
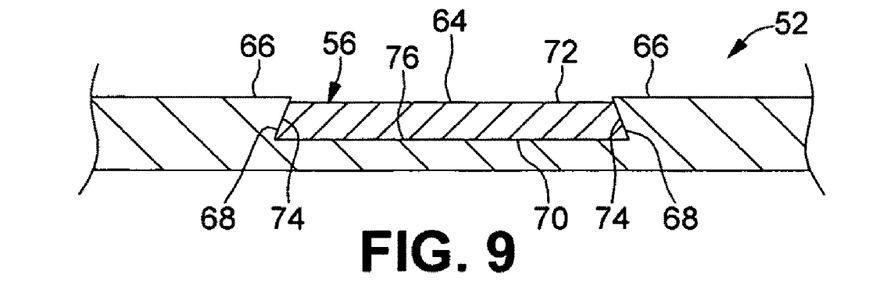
FIG. 9 is a cross-sectional view taken along the line 9-9 of FIG. 7.

The second portion of the composite spline 52 is the insert 56 which includes a single triangularly shaped tab 64 which cooperates with the first portion 54 of the composite spline 52 to hold the insert 56 in place. The first portion 54 of the composite spline is made of two raised, axially extending sections 66 which are integral with the drive body 50. The sections 66 are spaced apart and, together, they define a recess with a triangular shape that is complimentary to the shape of the triangularly shaped tab 64. The tab 64 has side walls 68 that are tapered so that, as the side walls 68 extend upwardly from a lower surface 70 to an upper surface 72, they are angled toward each other as best seen in FIG. 9. The sections 66 are shown in FIG. 9 as having complimentarily tapered side walls 74 with portions of the sections 66 overlapping portions of the tab 64 of the insert 56, and this configuration will securely hold the insert in its place in the composite spline. This configuration can be achieved by cutting the side walls 74 so that they extend radially when the insert is positioned into the composite spline. The sections 66 can then be coined or upset, adjacent to the tab 64 until the sections 66 assume the general shape shown for them in FIG. 9. The taper on the tab 64 could also be like the taper described above in reference to FIGS. 2 through 6 that would be obtained if the insert 56 was stamped out with a punch and a die. As shown in FIG. 9, a portion of the drive body 50, specifically, portions of the sections 66 of the first portion 54 of the composite spline 52, overlap portions of the insert 56, specifically, portions of the tab 64, to hold the insert 56 in its place in the composite spline 52.

Like the insert 20 of the first embodiment, the insert 56 is positively locked, at once, against movement relative to the drive body 50 in either radial direction and in either axial direction. Forces acting on the force receiving surface 58 of the insert 56 are transmitted to the first portion 54 of the composite spline 52. Co-action between the side wall 68 on one side of the tab 64 and the adjacent section 66 of the first portion 54 of the composite spline 52, on the one hand, and co-action between the other side wall 68, on the other side of the tab 64, and the adjacent section 66 of the first portion 54 of the composite spline 52, on the other hand, serve at once to lock the insert 56 against axial movement relative to the drive body 50 and vice-versa. At the same time, co-action between the lower surface 70 of the insert 56 and an outer surface 76 of the drive body 50 serves to prevent the insert 56 from moving radially inwardly relative to the drive body 50. Further, co-action between the side walls 68 on each side of the tab 64 and the adjacent sections 66 of the first portion 54 of the composite spline 52, serves at once to lock the insert 56 against movement radially outwardly relative to the drive body 50.

Figure 10:
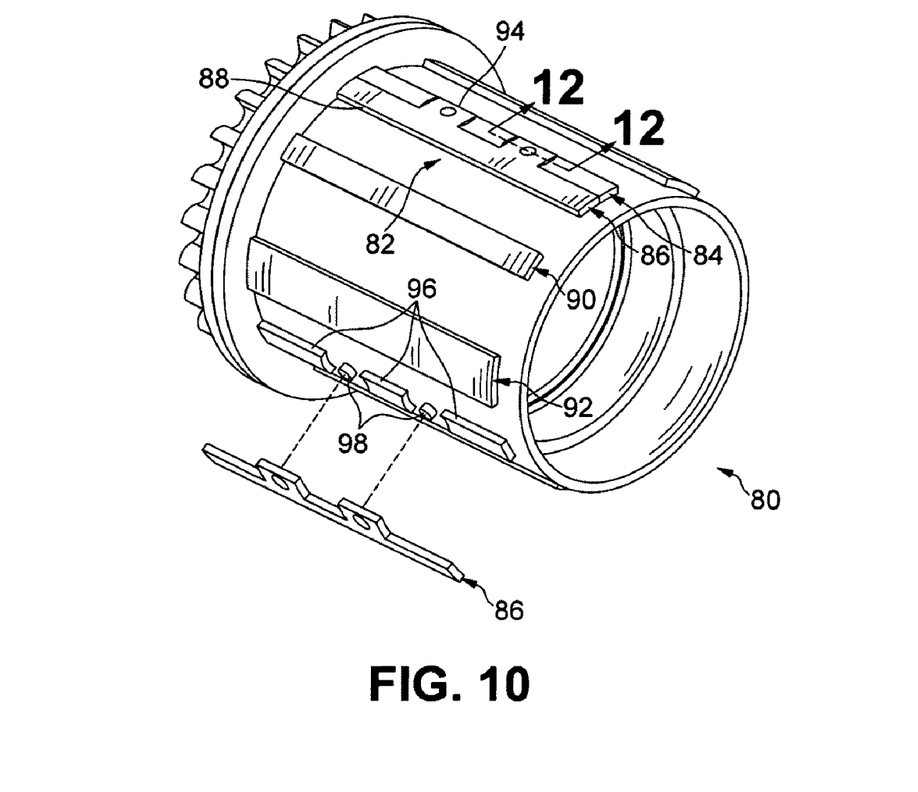
FIG. 10 is a perspective, partially exploded, view of a drive body showing inserts and a composite spline according to another embodiment of the invention.
Figure 11:
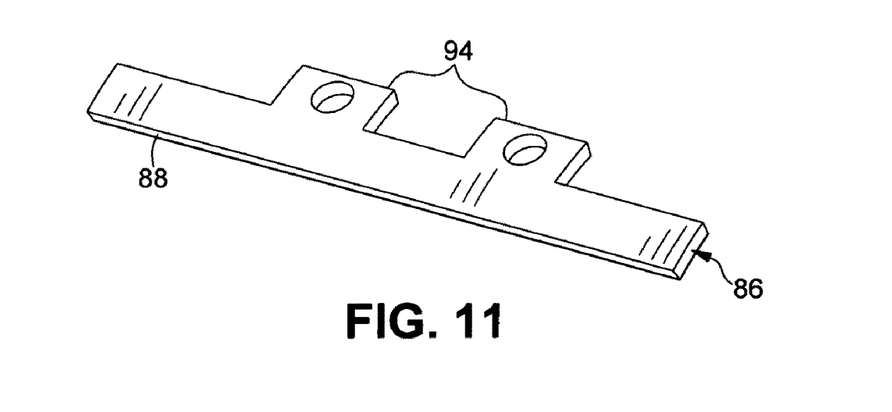
FIG. 11 is a perspective view of the insert shown in FIG. 10.

A third embodiment of a drive body with a composite spline is indicated generally at 80 in FIG. 10. The drive body 80 is similar to the drive bodies 10 and 50 except that the drive body 80 has a different composite spline arrangement. In FIG. 10, a composite spline 82 comprises a first portion 84 that is integral with the drive body 80 and is made up of the same material as the drive body 80. The composite spline 82 also comprises a second portion 86 that comprises an insert which is made up of a different, harder material than the material of the drive body 80. In the composite splines 82, there is a force receiving surface 88 and that surface is formed on the insert or second portion 86 of the composite spline 82. The drive body 80 includes a locator spline 90 and regular splines 92. The relatively hard material from which the second portion or insert 86 is made, resists wear much better than the relatively soft material from which the drive body 80 and the splines 90 and 92 and the first portion 84 of the composite splines 82 are all made.

Figure 12:
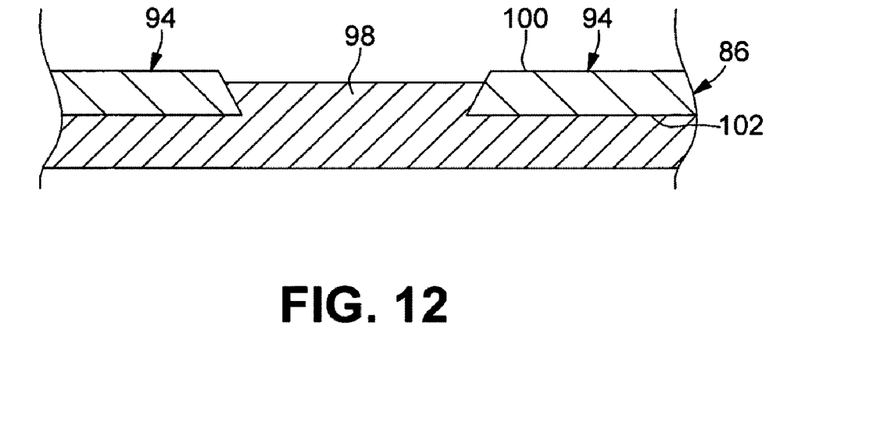
FIG. 12 is a cross-sectional view taken along the line 12-12 of FIG. 10.

The second portion of the composite spline 82 is the insert 86 which includes two rectangularly shaped tabs 94 which cooperate with the first portion 84 of the composite spline 82 to hold the insert 86 in place. The first portion 84 of the composite spline is comprised of three raised, axially extending sections 96 and two raised posts 98, all of which are integral with the drive body 80. The three sections 96 are spaced apart and, together, they define two recesses and the posts 98 are positioned in those recesses. The posts 98 and the two recesses may be formed at the same time with a hollow mill. The tabs 94 each have a bore extending through them and those bores are tapered so that they have a given diameter at the top, adjacent to an upper surface 100 of the insert 86 and a diameter at the bottom, adjacent to a lower surface 102 that is less than the given diameter. The diameter of the bores at the bottom of the tabs 94 is as big as or bigger than the diameter of the posts 98 so that the insert 86 may be positioned in its place in the composite spline 82 as shown near the top of FIG. 10. As a means of securing the insert 86 to the drive body 80, the posts can be coined or upset so that they get shorter and their diameter increases, where possible, so that portions of the posts 98 which are integral with the drive body 80, overlap portions of the insert 86 and, specifically, portions of the tabs 94 as can be seen clearly in FIG. 12. Like the previously described inserts, the insert 86 is positively locked, at once, against movement relative to the drive body 80 in either radial direction and in either axial direction. Further, forces acting on the force receiving surface 88 of the insert 86 are transmitted to the first portion 84 of the composite spline 82.

Figure 13:
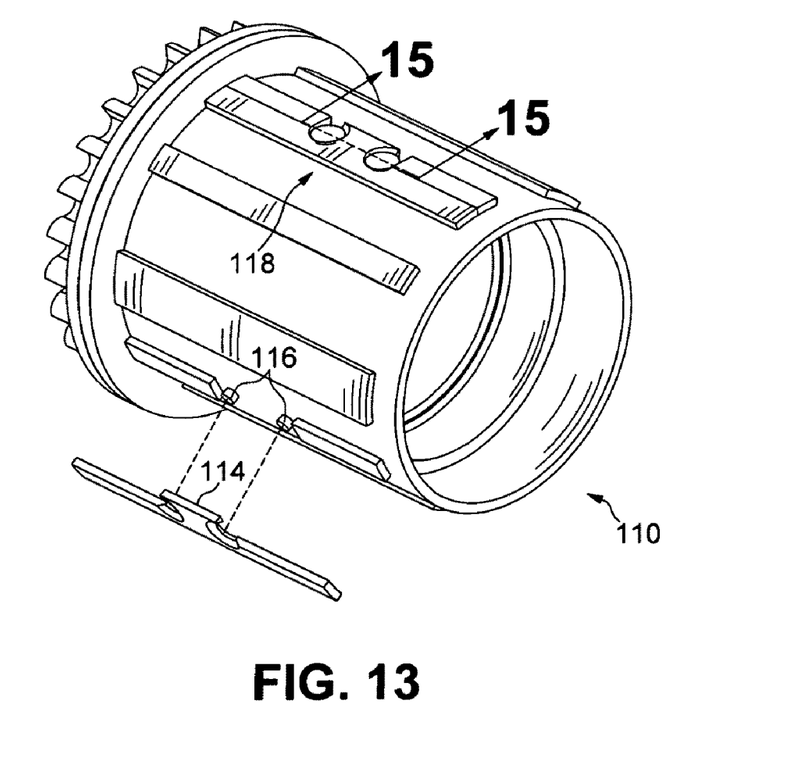
FIG. 13 is a perspective, partially exploded, view of a drive body showing inserts and a composite spline according to yet another embodiment of the invention.
Figure 14:
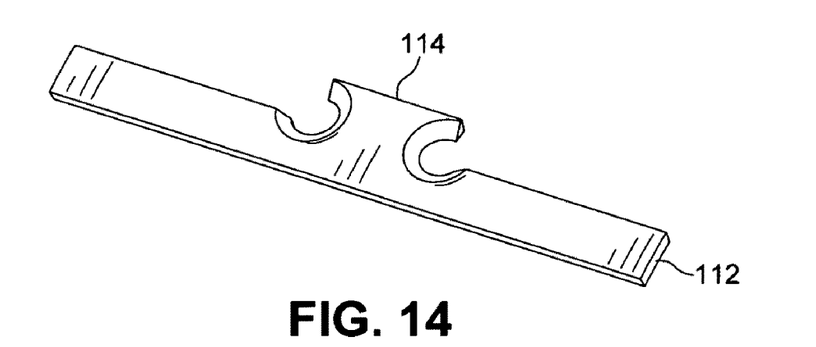
FIG. 14 is a perspective view of the insert shown in FIG. 13.
Figure 15:
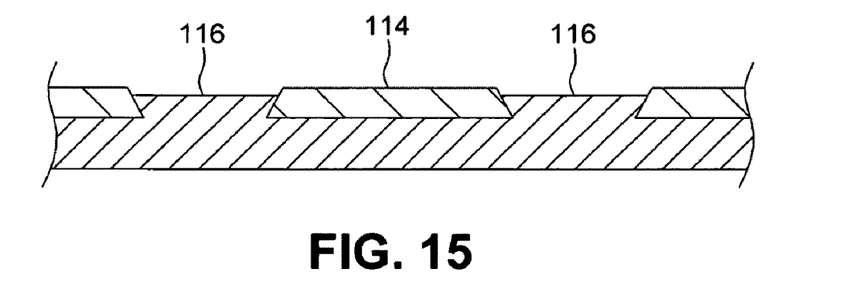
FIG. 15 is a cross-sectional view taken along the line 15-15 of FIG. 13.

Yet another embodiment of a drive body with at least one composite spline is indicated generally at 110 in FIG. 13. In this drive body 110, an insert 112 is provided which has a tab 114 which is defined, in part, by two partial tapered bores so that the insert may be engaged by two posts 116 which, as in previous embodiments, may be coined or upset to engage portions of the insert 112 to retain it in its position in a composite spline 118, as can be seen in FIG. 15. Like the previously described inserts, the insert 112 is positively locked, at once, against movement relative to the drive body 110 in either radial direction and in either axial direction. Further, forces acting on the insert 112 are transmitted to a first portion of the composite spline 118.

Figure 16:
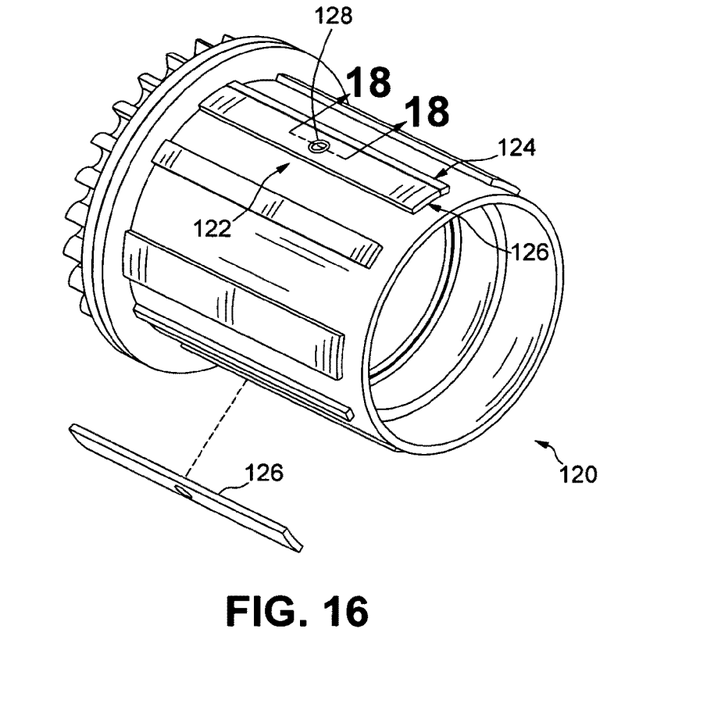
FIG. 16 is a perspective, partially exploded, view of a drive body showing inserts and a composite spline according to a still further embodiment of the invention.
Figure 17:
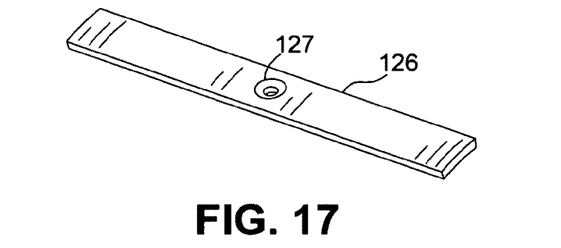
FIG. 17 is a perspective view of the insert shown in FIG. 16.
Figure 18:
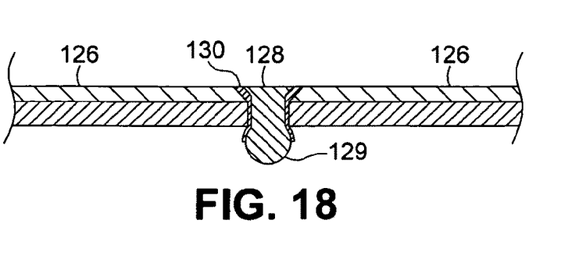
FIG. 18 is a cross-sectional view taken along the line 18-18 of FIG. 16.

A fifth embodiment of a drive body with a composite spline is indicated at 120 in FIG. 16. The composite spline 122 comprises a first portion 124, which is integral with and made of the same material as the drive body 120, and a second portion 126 which is an insert. The insert 126 is generally rectangular in shape and has a tapered bore indicated at 127 extending through it. A rivet 128 is received in the bore 127 and extends through the drive body 120, thereby securing the insert 126 and holding it tight to the drive body 120. A bulbous portion 129 of the rivet 128 engages an inside surface of the drive body 120 and a tapered portion of the rivet sleeve 130 engages the tapered bore 127 in the insert 126. Thus, the rivet 128 serves to lock the insert 126 to the drive body and to prevent relative movement between the insert 126 and the drive body 120 in either axial direction. The rivet 128 also serves to prevent the insert 126 from moving radially outwardly from the drive body 120 while co-action between the insert 126 and the drive body itself serves to prevent the insert 126 from moving radially inwardly relative to the drive body 120. It will be appreciated that in previously described embodiments, where a post formed of the drive body material is flattened to overlap portions of an insert, a rivet or other connector could be used in place of the post. Indeed, a post could be used in place of the rivet 128 and flattened to overlap portions of the insert.

Figure 19:
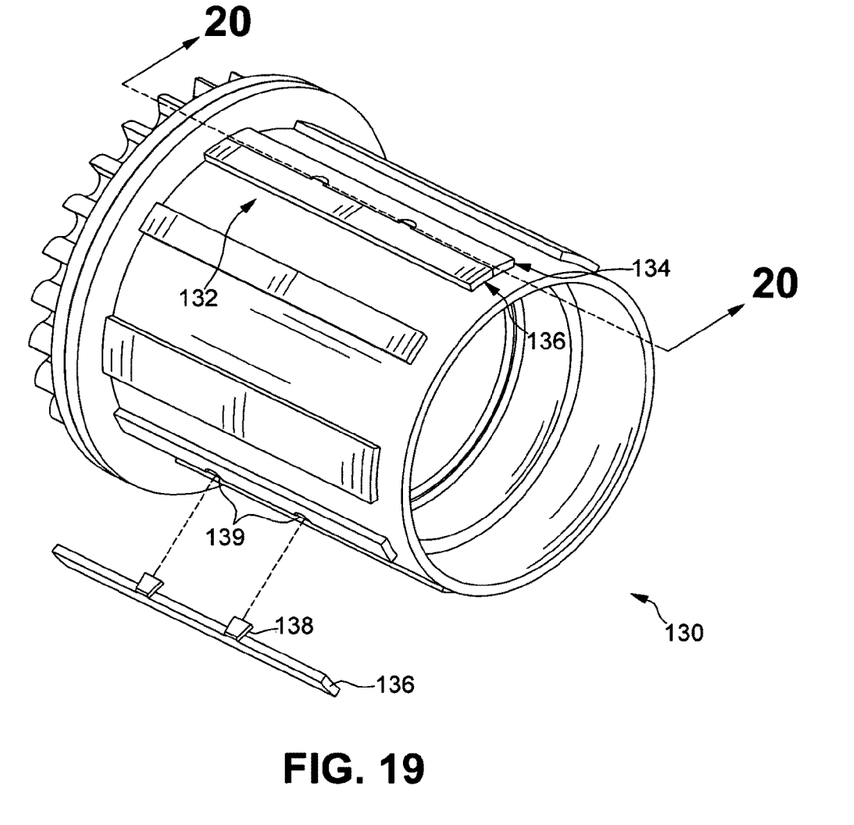
FIG. 19 is a perspective, partially exploded, view of a drive body showing inserts and a composite spline according to yet another embodiment of the invention.
Figure 20:
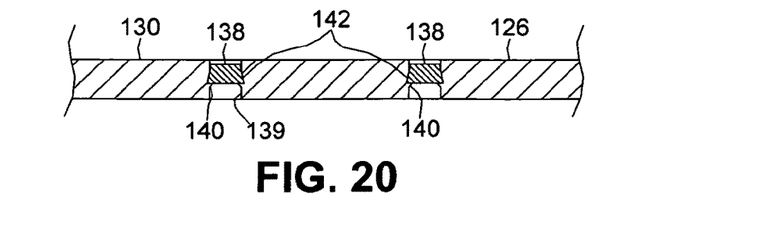
FIG. 20 is a cross-sectional view taken along the line 20-20 of FIG. 19.

A sixth embodiment of a drive body with a composite spline is indicated at 130 in FIG. 19. The drive body 130 includes a composite spline 132 which consists of a first portion 134 which is integral with and is a part of the drive body 130. The composite spline 132 further comprises an insert 136 which is generally rectangular in shape and includes two depending tabs 138 which are integral with the insert 136 and extend generally at right angles from the major portion of the insert 136. Holes indicated at 140 are formed in the drive body 130 and portions of the holes extend through parts of the first portion 134 of the composite spline 132. The tabs 138 are inserted into the holes 139 and they frictional engage the side wall of each hole 139, thereby securing the insert 136 in its illustrated position in the composite spline 132 shown at the top of FIG. 19. In FIGS. 19 and 20, the tabs 138 are shown as having an exaggerated taper where each tab 138 is wider at its free end than at its bent end. The exaggerated taper is shown to illustrate a frictional engagement that is possible between the insert 136 and the drive body 130. As shown in FIG. 20, when the free end or distal end of each tab 138 is slightly wider than the other, proximal end of the tab 138, and the width of the free end is slightly larger than the diameter of the hole 139, the tab 138 will displace some of the drive body 130 material and push it radially inwardly to create a shoulder, of sorts, as indicated at 140. As shown, with some exaggeration in FIG. 20, some of the drive body 130 material will spring back as indicated at 142 and will actually overlap a portion of each tab 138. This same condition of overlap can be obtained, although it would be on a more microscopic level, in the case where the tab is not tapered but is slightly wider than the diameter of the hole 139.

While I have shown and described my preferred embodiment and several alternative embodiments of the present invention, they are offered to illustrate the invention and not limit the true scope of the invention which may be found in the words and spirit of the appended claims.

I claim:

1. A splined drive body for a bicycle hub, said splined drive body being made of a first material and comprising at least one composite spline, said composite spline comprising a first portion which is made of said first material and comprises at least one force receiving surface, said composite spline further comprising a second portion comprising an insert which is made of a second material which is harder than said first material, said insert comprising a force receiving face, a force transmitting surface and at least two overlapped portions which cooperate with at least two corresponding overlapping parts of the first portion of said composite spline so as to hold said insert in place in said composite spline so that at least a portion of said insert force transmitting surface is in contact with at least a portion of the force receiving surface of said first portion of said composite spline, and so that relative axial movement between the drive body and said insert in either axial direction is prevented and movement of the insert radially outwardly from the drive body is prevented.

2. The drive body claimed in claim 1 wherein said insert further comprises at least one tab and said two overlapped portions are provided on said at least one tab.

3. The drive body claimed in claim 2 wherein at least a portion of said tab is defined by at least a portion of a wall defining a tapered bore.

4. The drive body claimed in claim 2 wherein said tab has a triangular shape.

5. The drive body claimed in claim 2 wherein said tab has a tapered bore extending therethrough and wherein portions of said tab surrounding the tapered bore constitute said at least two overlapped portions of said insert.

6. A splined drive body for a bicycle hub, said splined drive body being made of a first material and comprising at least one composite spline, said composite spline comprising a first portion which is made of said first material and comprises at least one force receiving surface, a second portion comprising an insert which is made of a second material which is harder than said first material, said insert comprising a force receiving face, a force transmitting surface and a connector positively and mechanically connecting said insert to the drive body so as to hold said insert in place in said composite spline so that at least a portion of said insert force transmitting surface is in contact with at least a portion of the force receiving surface of said first portion of said composite spline, and so that relative axial movement between the drive body and said insert in either axial direction is prevented and movement of the insert radially outwardly from the drive body is prevented.

7. The drive body claimed in claim 6 wherein said connector is a rivet.

8. The drive body claimed in claim 6 wherein said insert has a tapered bore extending therethrough and wherein portions of said insert surrounding the tapered bore are engaged by said connector.

9. The drive body claimed in claim 7 wherein said insert has a tapered bore extending therethrough and wherein portions of said insert surrounding the tapered bore are engaged by said rivet.

10. A splined drive body for a bicycle hub, said splined drive body being made of a first material and comprising at least one composite spline, said composite spline comprising a first portion which is made of said first material and comprises at least one force receiving surface, said composite spline further comprising a second portion comprising an insert which is made of a second material which is harder than said first material, said insert comprising a force receiving face, a force transmitting surface and at least one tab which frictionally engages at least two portions of the drive body so as to hold said insert in place in said composite spline so that at least a portion of said insert force transmitting surface is in contact with at least a portion of the force receiving surface of said first portion of said composite spline, and so that relative axial movement between the drive body and said insert in either axial direction is prevented and movement of the insert radially outwardly from the drive body is frictionally resisted.

11. The drive body claimed in claim 10 wherein said insert comprises at least two tabs.

12. The drive body claimed in claim 10 wherein said at least one tab is inside of a bore formed in said drive body and frictionally engages at least two portions of the drive body which define said bore.

\* \* \* \* \*